United States Patent [19]

Scheuer

[11] Patent Number: 5,498,099

[45] Date of Patent: Mar. 12, 1996

[54] BUTT JOINT

[75] Inventor: Helmuth Scheuer, Enger, Germany

[73] Assignee: Schüco International KG, Bielefeld, Germany

[21] Appl. No.: 214,941

[22] Filed: Mar. 17, 1994

[30] Foreign Application Priority Data

Mar. 17, 1993 [DE] Germany .......................... 43 08 540.7

[51] Int. Cl.[6] ............................... E06B 3/96; F16B 12/50
[52] U.S. Cl. ........................... 403/403; 403/402; 403/231; 403/267; 403/265
[58] Field of Search ..................... 403/267, 266, 403/268, 265, 231, 260, 258, 256, 402, 403; 52/655.1, 665, 456, 656.9, 656.5, 656.6; 49/504

[56] References Cited

U.S. PATENT DOCUMENTS

| | | | |
|---|---|---|---|
| 2,736,930 | 3/1956 | Longley | 403/265 X |
| 3,425,159 | 2/1969 | Fortsch et al. | 49/504 |
| 3,429,601 | 2/1969 | Bremers | 52/665 X |
| 3,816,011 | 6/1974 | Biebuyck et al. | 403/260 X |
| 5,116,161 | 5/1992 | Faisst | 403/403 X |
| 5,297,891 | 3/1994 | Rosa | 49/504 X |

FOREIGN PATENT DOCUMENTS

| | | | |
|---|---|---|---|
| 567837 | 1/1933 | Germany | 49/504 |
| 7935701 U1 | 12/1979 | Germany . | |

Primary Examiner—Anthony Knight
Attorney, Agent, or Firm—Darby & Darby

[57] ABSTRACT

A butt joint includes a first hollow profile member having a projecting first stop. The first stop has a first web and a groove-bounding web. A second hollow profile member is connected to the first hollow profile member to form an inside corner. The second profile member has a projecting second stop. The second stop has a first web and a groove-bounding web. A reinforcement part is disposed adjacent to the inside corner. The reinforcement part is elastically deformable and is supported by the first stop and the second stop.

13 Claims, 6 Drawing Sheets

FIG. 9
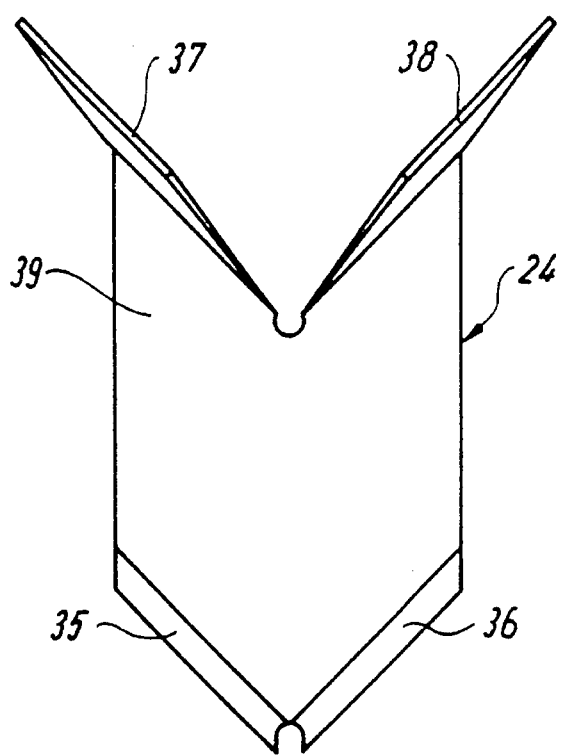
FIG. 11
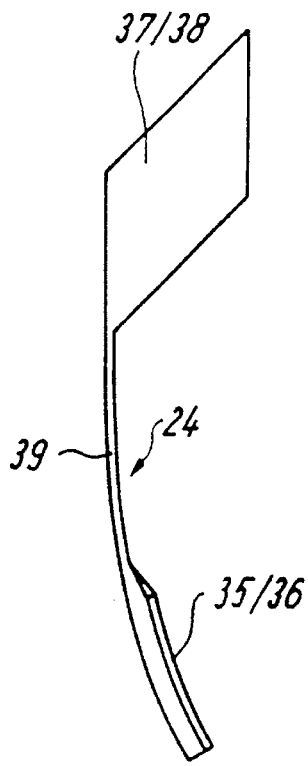
FIG. 10
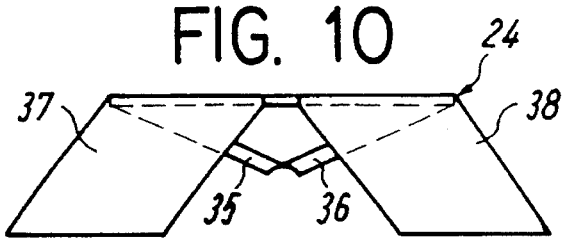
FIG. 7    FIG. 8
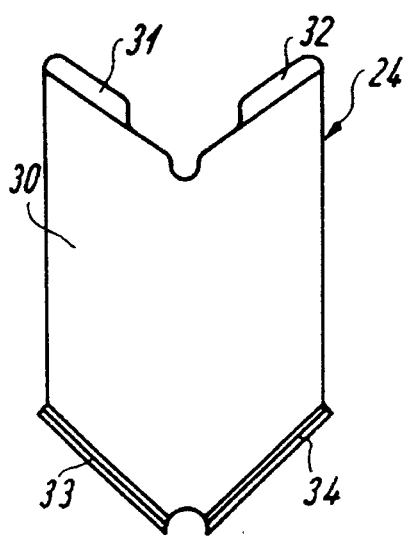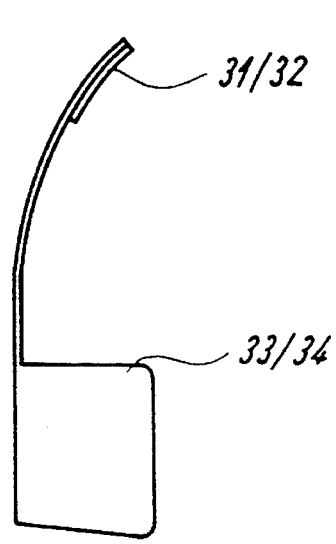

BUTT JOINT

FIELD OF THE INVENTION

The present invention relates to a butt joint in the form of a corner- or T-joint. More specifically, the present invention relates to a butt joint in which the hollow profile sections, which make an angle with one another, and each of which has at least one outer web that forms a stop, are joined, by means of a profile joining part which engages them, so as to form the butt joint, and in which a preformed reinforcement part, which covers the butt joint on the inside, is placed in the corner area.

BACKGROUND OF THE INVENTION

A butt joint, in the form of a T-joint, is known from, for example, DE 79 35 701 U 1. With this T-joint, clamping elements are attached in the areas of the longitudinal edges of the profiles, and these clamping elements extend beyond the butt joint and attach in undercut grooves. Each clamping element consists of a plate-shaped part with an integrally attached hook and a base part. The joint itself is made by a screw. The base part has recesses on two diametrically opposite corners, and these recesses form cams which grip behind the edge webs of grooves. In this way, a positive interlock is formed between the clamping elements and the undercut groove. When the screw is tightened, the screw is supported against the base of the groove and can even dig into the groove. A practical disadvantage of this system is that these parts can be used only if two undercut grooves, to receive the clamping elements, are present in the edge areas of each stop. Another disadvantage is that assembly is difficult because the second section of the hollow profile must be pushed onto the legs of the profile joining part and onto the clamping elements. Since the sections of the hollow profile are relatively long, assembly is made even more difficult. Another consideration is that the hollow profile sections are made with close tolerances so that the legs of the profile joining parts and those of the clamping elements which form the preformed reinforcement parts will exert a closure-type grip on the hollow profile sections.

From practical experience it is also known that the angled parts for reinforcement can be used in place of the clamping elements. Further, before the hollow profile sections are joined, these angled parts must be pushed into the hollow profile section. The problems described above also occur here. Furthermore, in the case of all these designs, additional sealing in the area of the butt joint by means of a sealant is not possible.

The preformed reinforcement parts, in the form of clamping elements or reinforcement angle parts, are necessary to align the pressed-on stops so that the outer surfaces of the profiles are flush with one another in the area of the butt joint.

SUMMARY OF THE INVENTION

It is an object of the present invention to design butt joints, so that the preformed reinforcement parts can be inserted into the respective corner or butt area subsequently, i.e. after making a connection by means of profile connection parts. Also, if desired it is an object to permit application of an additional seal in the area of the butt joint by means of a sealant.

This object is achieved in such a way that the preformed reinforcement part is elastically deformable and is supported by those inside profile webs which define the respective stop. The preformed reinforcement part which aligns the stops is elastically deformable, and thus the butt joint made from the two hollow profile sections can first be assembled, and the preformed reinforcement part can be inserted in the respective corners subsequently. It is not necessary for the grooves to be undercut in order to firmly seat the preformed reinforcement parts. It is completely adequate for the stops to have webs protruding on the inside, since the preformed reinforcement part under tension effects a non-positive seating. The elastic deformability of the preformed reinforcement part also balances out the tolerances, since the part can deform with more or less strength so as to effect a proper fit. Furthermore, the separating screw is obviated, which otherwise might damage the anodizing coating of the profile sections. If the preformed reinforcement part is appropriately designed, it is also possible to subsequently to seal the area of the butt joint by means of a sealing compound.

The shape of the preformed reinforcement part depends on the type of butt joint and on the profile. However, the reinforcement part can be made of a piece of spring-steel. The reinforcement part can also be made of plastic, if this plastic can be appropriately deformed elastically.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 7 shows the preformed reinforcement part for the butt joint according to FIGS. 1–3;

FIG. 8 is a side view of the preformed reinforcement part; and

FIGS. 9–11 show various preformed reinforcement parts for an outside corner.

DETAILED DESCRIPTION OF THE INVENTION

Figure 1:
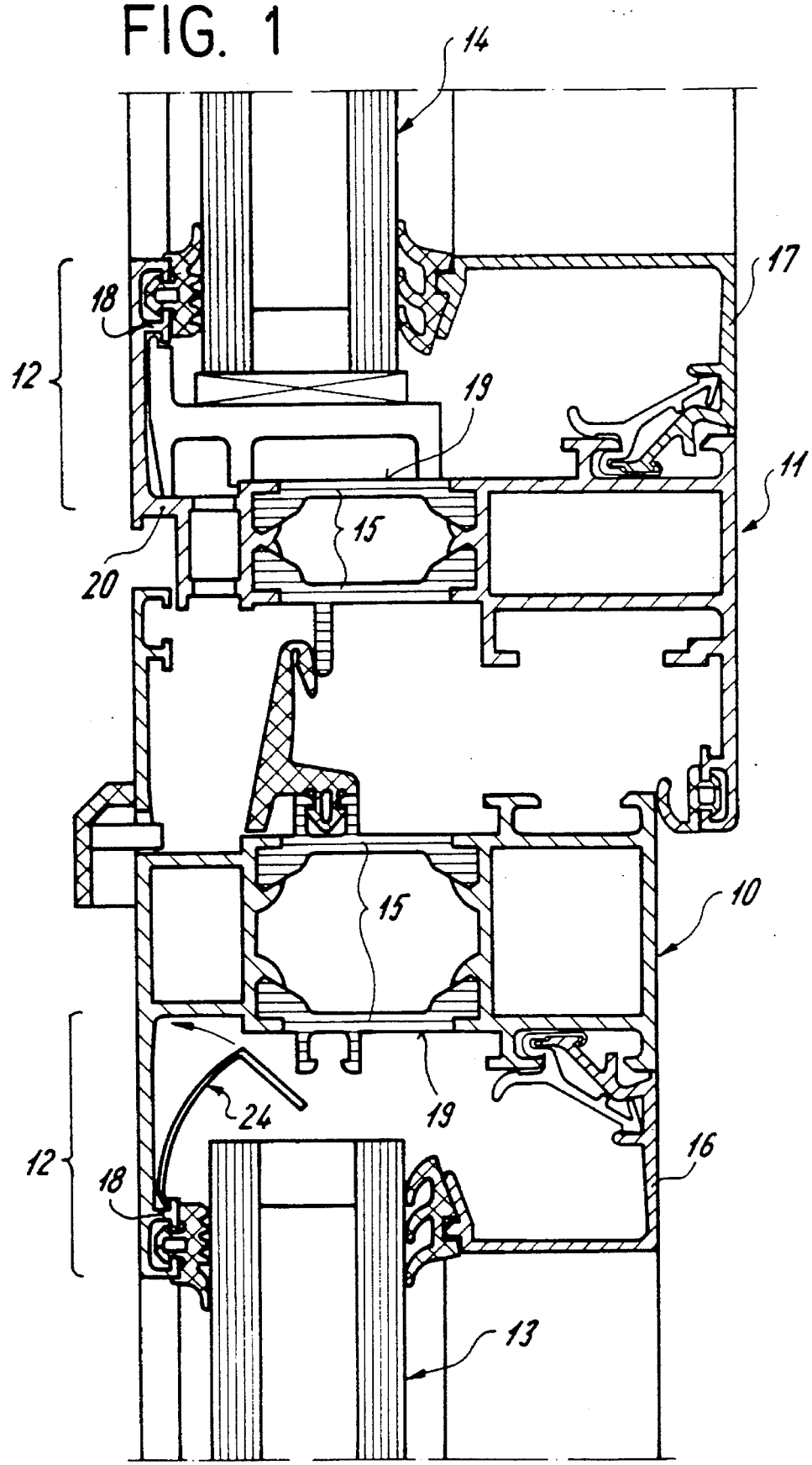
FIG. 1 is a sectional view of a window with a preformed reinforcement part.

Referring now to FIG. 1, a window in a horizontal section, comprising a frame 10 and a sash 11, is illustrated. However, for the sake of clarity in the illustration, only a cross beam of the frame is shown. Frame 10 is designed as a rung-type profile. The profiles of the frame 10 and of the sash 11 each have an outer web on the outside, which forms a stop 12 for the panes 13, 14 of insulating glass, which are inserted into the frame 10 and sash 11. These profiles are composite profiles, whose insulating webs are identified by the reference symbol 15.

The insulating glass panes 13, 14 are set into the frame 10 and sash 11 by means of glass-holding strips 16, 17 disposed on the inside, opposite the stops 12. As FIG. 1 clearly shows, those areas of the stops 12, which face away from one another, each have a receiving groove on the inside for a gasket which contacts the outer glass pane. The groove-bounding webs 18, which face one another, and which also face the insulating webs 15, have a T-shaped cross section. These groove-bounding webs 18 are associated with the so-called fold of the profile. The height of the profile fold is defined by the outer surface of the two outer insulating webs 15, and is identified by the reference symbol 19. The webs 20, 21 bound the stops 12 in the area of the height of the profile-fold, are integrally attached on the inside, and are perpendicular to the stops 12. Webs 20, 21 are displaced relative to the outside surfaces of the insulating webs 15, which define the height of the profile-fold 19 in such a way that they are always displaced in the direction toward the other web. Their displacement approximately corresponds to the thickness of the profile walls. Moisture collecting planes thus form on those faces of the webs 20, 21 which face away from one another.

Figure 3:
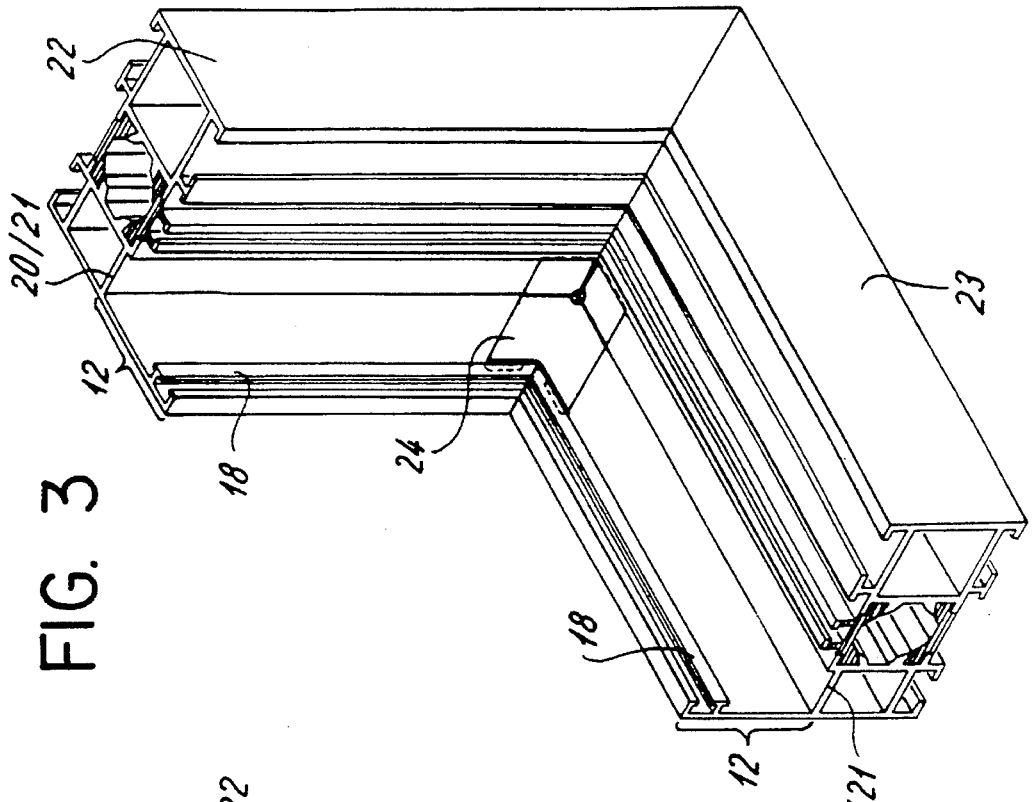
FIG. 3 is a representation corresponding to that of FIG. 2, but with the preformed reinforcement part in the end position.
Figure 2:
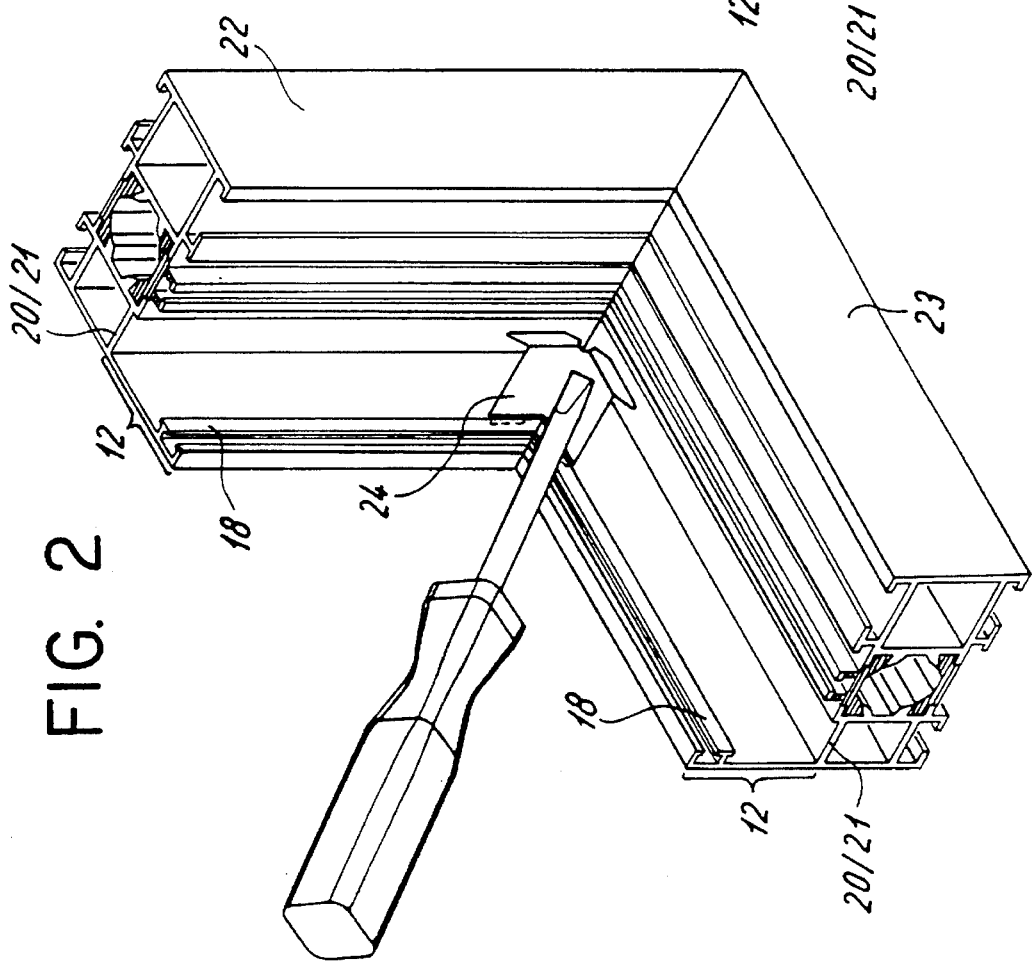
FIG. 2 is a butt joint formed as an inside corner with an as yet unmounted preformed reinforcement part.

The butt joints illustrated in FIGS. 2 and 3 are corner joints in the form of inside corners. The miter-cut hollow profile sections 22, 23 are connected to one another in a conventional manner by corner joining parts (not shown). The two stops 12 of the hollow profile sections 22, 23 form a butt joint which needs to be aligned. A preformed reinforcement part 24, which will be explained in more detail below, is used to align the two stops 12. Reinforcement part 24 has an angular shape corresponding to the corner and has tabs, which are bent at an angle at both face ends so as to grip behind the T-shaped groove-bounding webs 18. The opposite tabs, which are bent at an angle, contact the webs 20 and 21 such that the free edges are supported against the edges of webs, which are displaced relative to the webs 20, 21 and which run parallel with some distance between them and the stops 12. In this way, it becomes possible for the appropriately shaped preformed reinforcement part 24 to be pressed into the inside corner, for example by means of a screwdriver, as is shown in FIG. 2. The preformed reinforcement part 24 is designed so that it is subject to tension in its end position according to FIG. 3, so that it will not fall out or be displaced from the corner. This suitably effects a positive interlock, as a result of which not only is the butt joint formed from the stops 12, but the outside surfaces of the stops 12 are also aligned flush with one another. The butt surfaces of the stops of an outside corner are aligned in similar fashion, if the preformed reinforcement part is appropriately designed.

Figure 4:
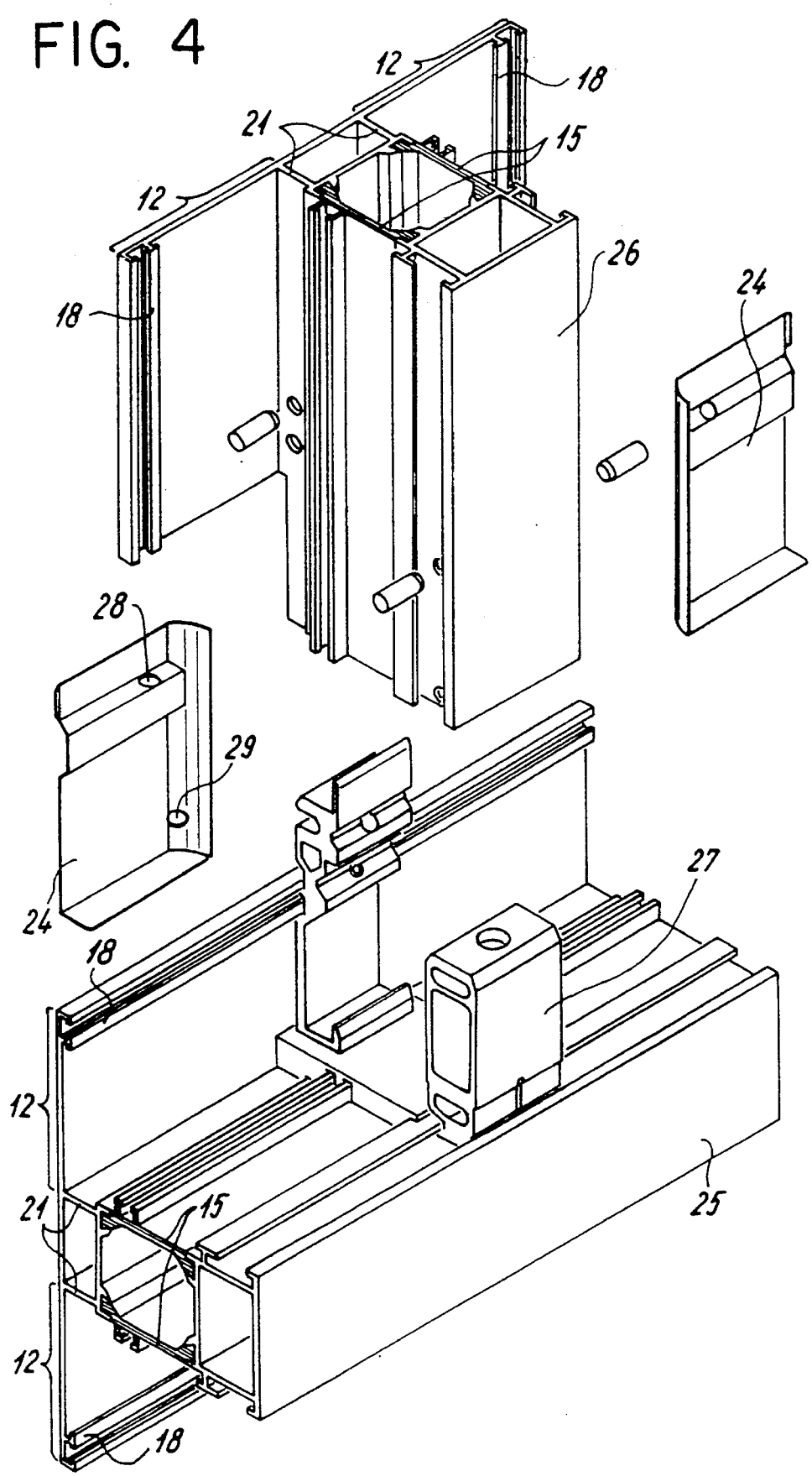
FIG. 4 is an exploded view of a butt joint in the form of a T-joint in an exploded view.
Figure 5:
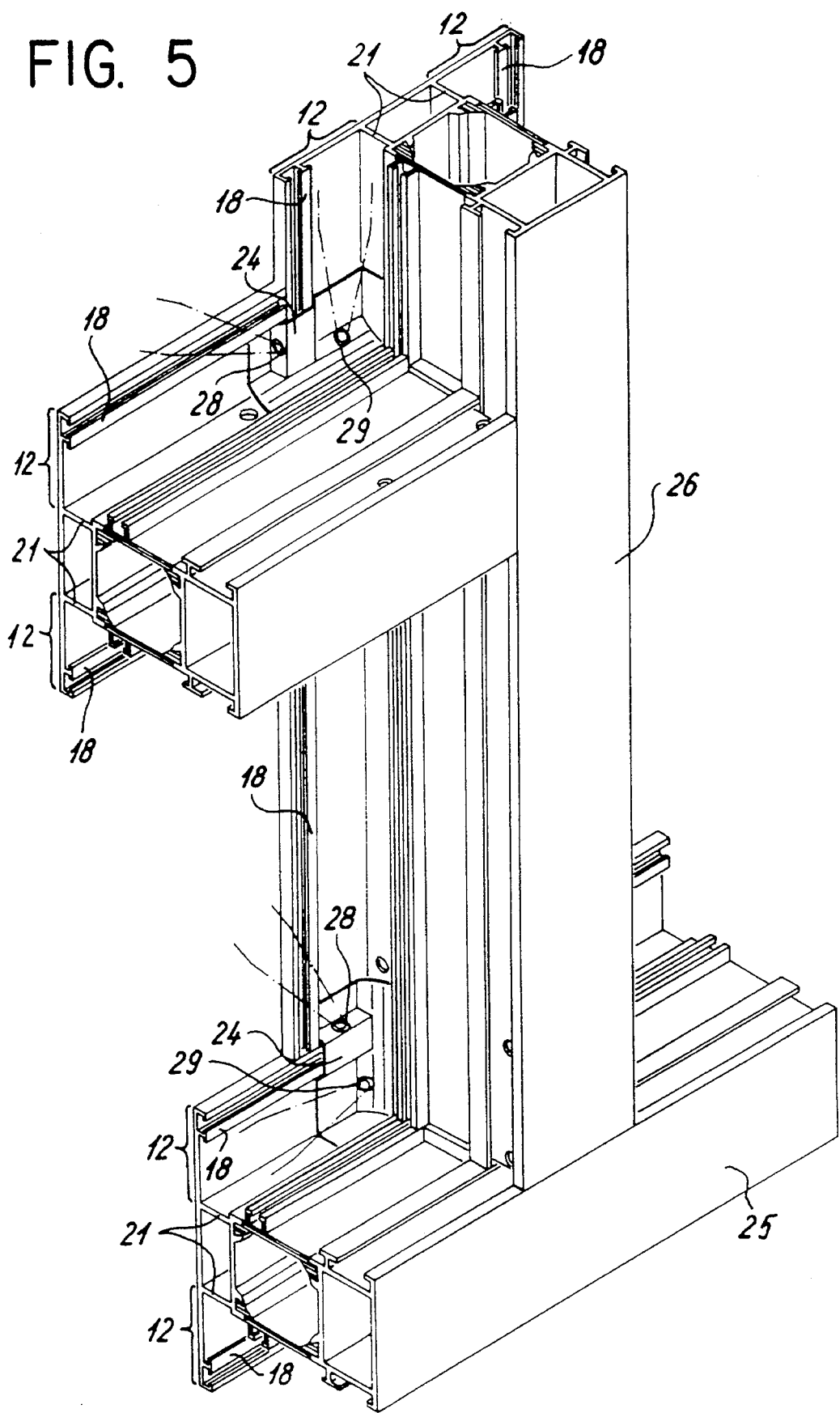
FIG. 5 is a representation corresponding to that of FIG. 4, which shows the final condition of the T-joint, but with a second T-joint, which is formed by another horizontal hollow profile section, so as to show the possibility of sealing a butt joint.

FIG. 4 illustrates a connection of a horizontal frame-type profile 25 with a vertical rung-type profile 26, by means of a T-joint part 27. The frame-type and the rung-type profile 25, 26 each have two stops 12, which again are bounded by the groove-bounding webs 18 and 21. Two preformed reinforcement parts 24 are needed for this T-joint, so as to cover the butt joints that are formed from the stops 12, as clearly shown in FIG. 5. Each preformed reinforcement part 24 is shaped so that the webs 18 are covered. The illustrated preformed reinforcement part 24 is bent at an angle on that side which faces the two webs 21, so that the opposite edge grips T-shaped groove-bounding web 18 underneath, and so that the tab, which is bent at an angle, contacts the web 21. The preformed reinforcement part 24 again is designed in such a way that it is subject to tension if it has been pressed into its end position according to FIG. 5. FIG. 5 furthermore shows that the same preformed reinforcement part 24 is used to cover butt joints in connection with a T-joint if a profile with the same cross section has been set horizontally on the vertical rung-type profile 26. The joint is again made by appropriate joining parts. The two figures also show that a sealant to seal the joints can be injected through the holes 28, 29. Injection of the sealant can be achieved by means of a cartridge, which is indicated in phantom in FIG. 5.

Figure 6:
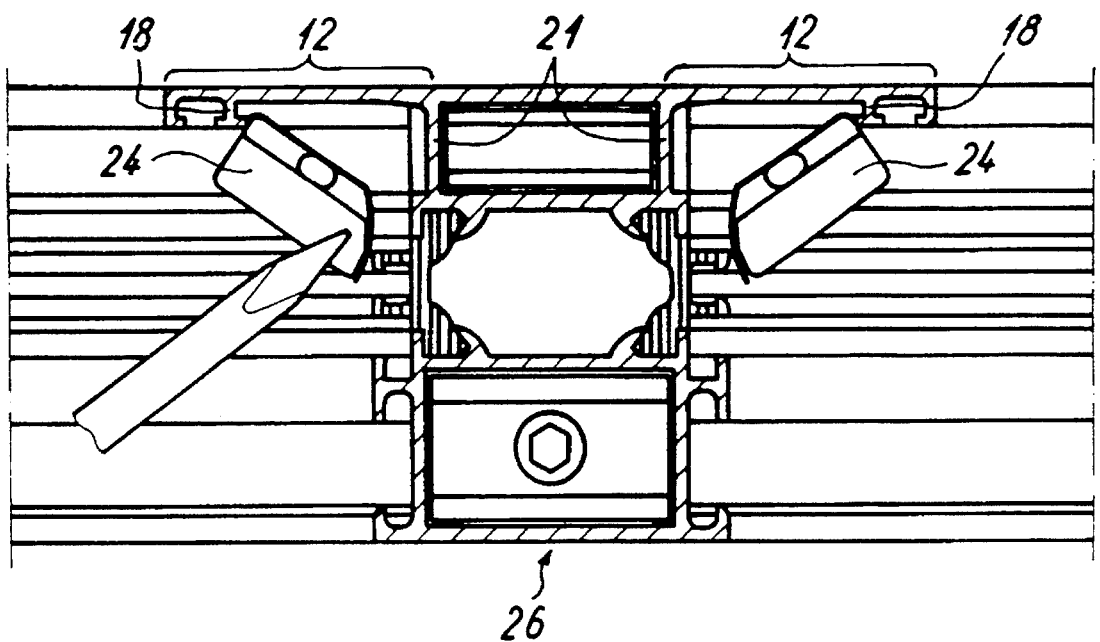
FIG. 6 shows the mounting of the preformed reinforcement parts with a view that is perpendicular to the vertical rung.

FIG. 6 shows how the preformed reinforcement part 24 is inserted to join the horizontal frame-type profile 25 with the vertical rung-type profile 26. Thus, each preformed reinforcement part 24 is placed, with its tab bent at an angle, behind the mutually facing webs of the groove-bounding webs 18. By means of a suitable tool, the preformed reinforcement part 24 is then pressed between the groove-bounding webs 18 and the two webs 21 in such a way that those surfaces of the preformed reinforcement part 24 which lie opposite the T-shaped groove-bounding webs 18 contact those surfaces of the webs 21 which face away from one another. Each preformed reinforcement part is designed so that it is then subject to tension. Each preformed reinforcement part 24 may be made of spring-steel. However, part 24 can also be made of a suitable, flexible plastic.

FIG. 7 shows an angled preformed reinforcement part 24 for an inside corner according to FIGS. 1 to 3. The preformed reinforcement part 24 consists of an angled base body 30. On one side, two spring tabs 31, 32 are integrally attached to the base body, so as to make an obtuse angle with the surfaces of the angled base body 30. At the inside corner of FIGS. 2 and 3, these spring tabs 31, 32 grip behind the inside webs of the groove-bounding webs 18. Because of the spring tension, the angled spring tabs 31, 32 compensate for the size difference between the width of the groove and the width of the plate of the preformed reinforcement part 24. At the opposite side, the base body 30 has two other spring tabs, 33, 34, and these are crimped off toward the other side and, when they are installed, are supported against those surfaces of the drainage fold which face away from one another. The angle enclosed between the outer surfaces of the angled base body 30 and the spring tabs 33, 34 is greater than 90 degrees. The two parts of the angled base body 30 make an angle with one another, which is just barely more than 90 degrees. This angle provides for the pre-tension after mounting. The angle enclosed between the surfaces of the angled base body 30 and the spring tabs 33, 34 is likewise greater than 90 degrees. FIGS. 2 and 3 show how the preformed reinforcement part 24 is pressed into the inside corners.

FIG. 8 shows the preformed reinforcement part 24 for an inside corner, in a side view. The base body 30 is pre-tensioned so as to assume a curved shape. This pre-tension causes the spring tabs 31, 32 to be inserted at the groove-bounding web 18 and, because the length is shortened, the pre-tension causes the preformed reinforcement part 24 to be inserted into the inside corner. There, the spring tabs 33, 34, which are subject to pre-tension, will catch in the groove that is bounded by the webs 21 and align the stops 12 flush with one another. Also, the butt joint formed by the stops 12 is now covered on the inside.

FIGS. 9 through 11 show a preformed reinforcement part 24 for an outside corner. This preformed reinforcement part 24 essentially corresponds to the preformed reinforcement part 24 of FIGS. 7 and 8. The spring tabs, which grip behind the webs of the groove-bounding webs 18, are identified by the reference symbols 35, 36. The spring tabs which grip behind the webs each bound a drainage fold, and are identified by the reference symbols 37, 38. The base body again has an angled shape and is identified by the reference symbol 39. These figures, too, show that first the spring tabs 35, 36 are placed behind the webs of the groove-bounding webs 18, and that then, by means of a suitable tool, the preformed reinforcement part 24 is pressed into the outside corner. Again, the spring tabs 37, 38 extend into the base of the groove of the drainage fold that is bounded by the webs.

From the foregoing description, it will be appreciated that the present invention makes available, a compact, cost efficient preformed reinforcement part to cover the corner of a butt joint. Having described the presently preferred exemplary embodiment of a new and improved preformed reinforcement part to cover the corner of a butt joint. In accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

What I claim is:

1. A butt joint comprising:
   a first hollow profile member having an interior surface, and exterior surface an a projecting first stop, said first stop comprising a first web and a groove-bounding web;
   a second hollow profile member being connected to said first hollow profile member to form an inside corner, said second profile member having a interior surface, an exterior surface and a projecting second stop, said second stop comprising a first web and a groove-bounding web; and
   a reinforcement part being disposed adjacent to said inside corner, said reinforcement part being elastically deformable and being supported by said first stop and said second stop such that said reinforcement part is disposed solely on the interior surface of the first hollow profile member and the interior surface of the second hollow profile member.

2. The butt joint of claim 1, wherein said reinforcement part is thinner than said webs of said hollow profile members, and wherein said reinforcement parts are elastically deformable.

3. The butt joint of claim 1, wherein said reinforcement parts have an angled base body, such that the enclosed angle is slightly greater than 90 degrees.

4. The butt joint of claim 3, wherein said reinforcement parts have angled spring tabs at one face end, and spring tabs at the other face end, such that the angle between the surfaces of the angled base body and the tabs is an obtuse angle, said spring tabs grip behind said groove-bounding web behind said first web.

5. The butt joint of claim 4, wherein said webs, are displaced relative to an insulating web, said insulating web determines the depth of a profile fold, said displacement being in the direction toward the other web, such that said displacement corresponds to the thickness of the webs of the hollow profile members.

6. The butt joint of claim 1, wherein said second hollow profile member is connected to said first hollow profile member, in the form a T-joint, said reinforcement parts have a base body having an angled cross section, such that a middle area of said base body has a constriction which grips over the webs and which forms a groove for receiving a seal.

7. The butt joint of claim 1, wherein said reinforcement part has at least one hole for injecting a sealing compound into a joint area between said first hollow profile member and said second hollow profile member.

8. A butt joint comprising:
   a first hollow profile member having an interior surface, an exterior surface and a projecting first stop, said first stop comprising a first web and a groove-bounding web;
   a second hollow profile member being connected to said first hollow profile member to form an outside corner, said second profile member having an interior surface, an exterior surface and a projecting second stop, said second stop comprising a first web and a groove-bounding web; and
   a reinforcement part being disposed adjacent to said outside corner, said reinforcement part being elastically deformable and being supported by said first stop and said second stop, such that said reinforcement part is disposed solely on the exterior surface of the first hollow profile member and the exterior surface of the second hollow profile member.

9. The butt joint of claim 8, wherein said reinforcement part is thinner than said webs of said hollow profile members, and wherein said reinforcement parts are elastically deformable.

10. The butt joint of claim 8, wherein said reinforcement parts have an angled base body, such that the enclosed angle is slightly greater than 90 degrees.

11. The butt joint of claim 10, wherein said reinforcement parts have angled spring tabs at one face end, and spring tabs at the other face end, such that the angle between the surfaces of the angled base body and the tabs is an obtuse angle, said spring tabs grip behind said groove-bounding web behind said first web.

12. The butt joint of claim 11, wherein said webs, are displaced relative to an insulating web, said insulating web determines the depth of a profile fold, said displacement being in the direction toward the other web, such that said displacement corresponds to the thickness of the webs of the hollow profile members.

13. The butt joint of claim 8, wherein said reinforcement part has at least one hole for injecting a sealing compound into a joint area between said first hollow profile member and said second hollow profile member.

\* \* \* \* \*